United States Patent [19]

Aoyama

[11] Patent Number: 5,044,519
[45] Date of Patent: Sep. 3, 1991

[54] APPARATUS FOR FEEDING SLENDER PARTS

[76] Inventor: Yoshitaka Aoyama, 20-11, Makitsukadai 2-chome, Sakai-shi, Osaka 590-01, Japan

[21] Appl. No.: 423,302

[22] Filed: Oct. 18, 1989

[30] Foreign Application Priority Data

Oct. 22, 1988 [JP] Japan ............................. 63-266885
Jun. 17, 1989 [JP] Japan ................................ 1-155038

[51] Int. Cl.$^5$ ............................................ B23Q 7/04
[52] U.S. Cl. ..................... 221/212; 221/224; 221/239
[58] Field of Search ............... 221/212, 172, 251, 238, 221/171, 156, 224, 239, 258, 262, 236, 270; 81/57.37, 431, 435

[56] References Cited

U.S. PATENT DOCUMENTS 3,494,393  2/1970  Casanov ..................... 221/212 X

FOREIGN PATENT DOCUMENTS 104514  4/1989  Japan ........................... 221/212
104515  4/1989  Japan ........................... 221/212

Primary Examiner—David H. Bollinger
Attorney, Agent, or Firm—Armstrong, Nikaido, Marmelstein, Kubovcik & Murray

[57] ABSTRACT

A feeding device for feeding slender parts such as bolts or other fasteners to a predetermined work station includes a feed rod having one end adapted for magnetically holding a slender part. The feed rod is mounted for reciprocating movement between a retracted position spaced from the work station and a second position adjacent the work station. A feed tube is disposed at an acute angle relative to the path of movement of the feed rod with an open lower end adjacent the holding end of the feed rod in the retracted position. Slender parts are supplied to an upper part of the feed tube to fall freely through the feed tube and are delivered to the end of the feed rod where they are magnetically held and moved to the work station.

11 Claims, 4 Drawing Sheets

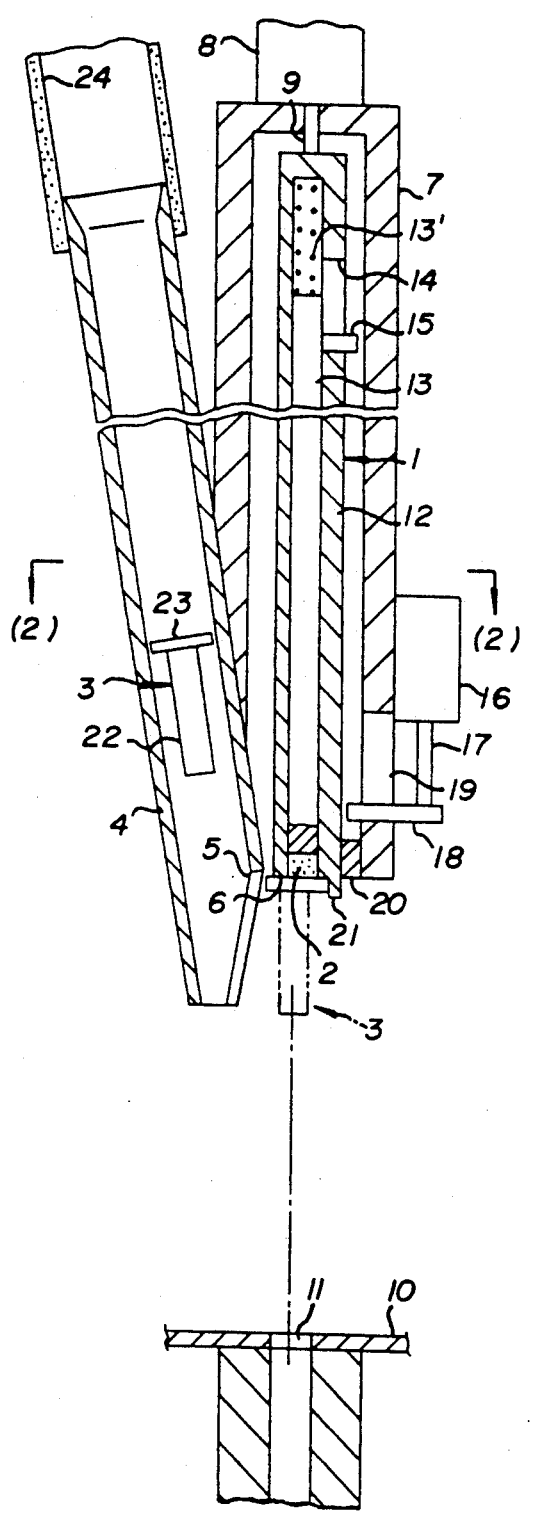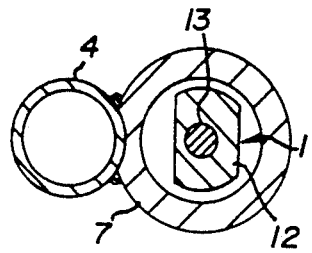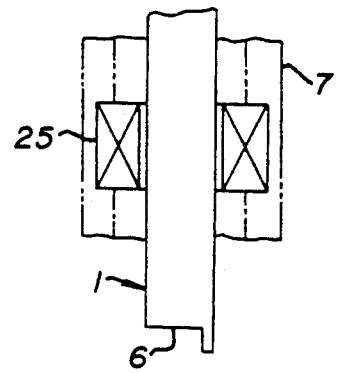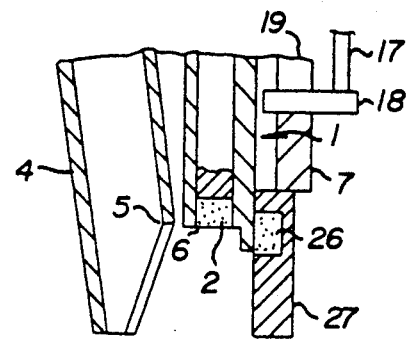
FIG. 1
FIG. 2
FIG. 3
FIG. 4

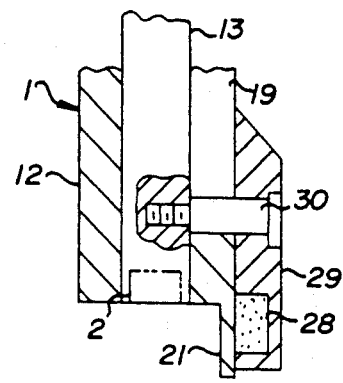
FIG.5
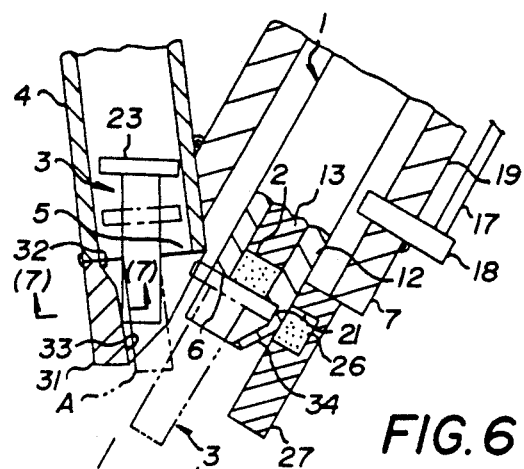
FIG.6
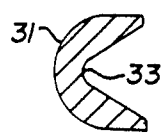
FIG.7
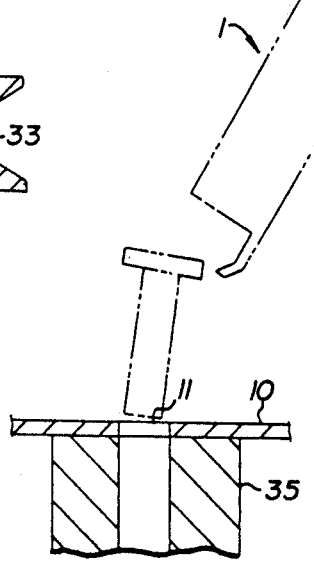
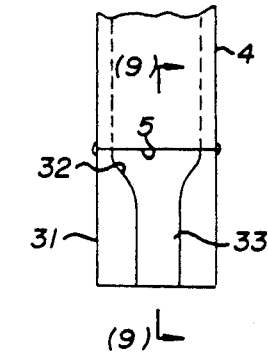
FIG.8
FIG.9
FIG.10
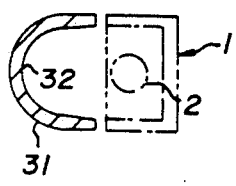
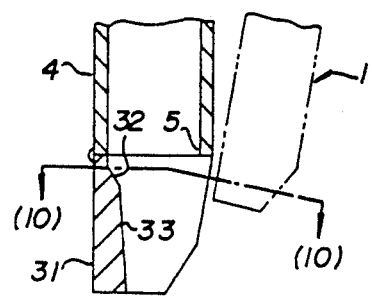

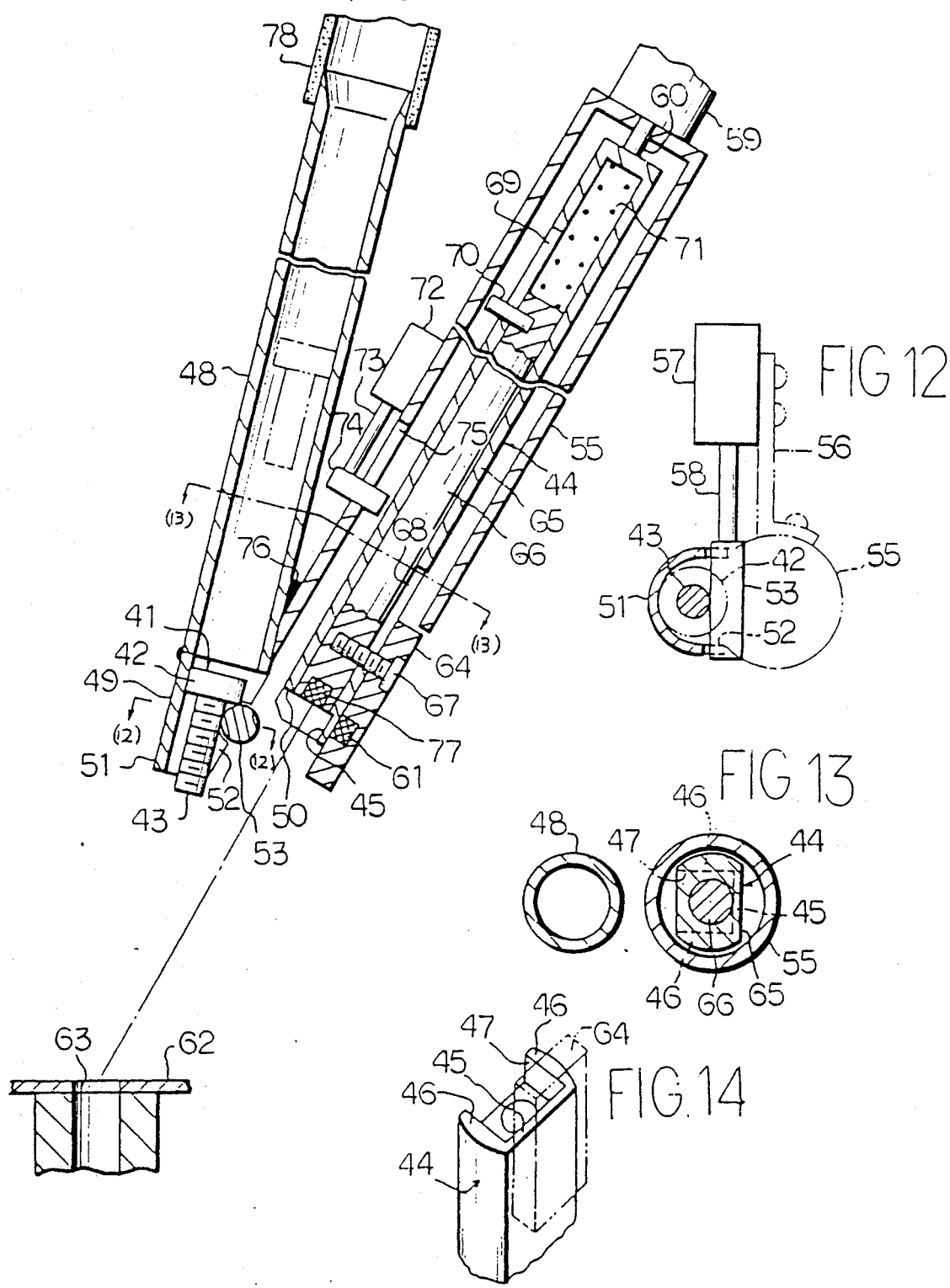

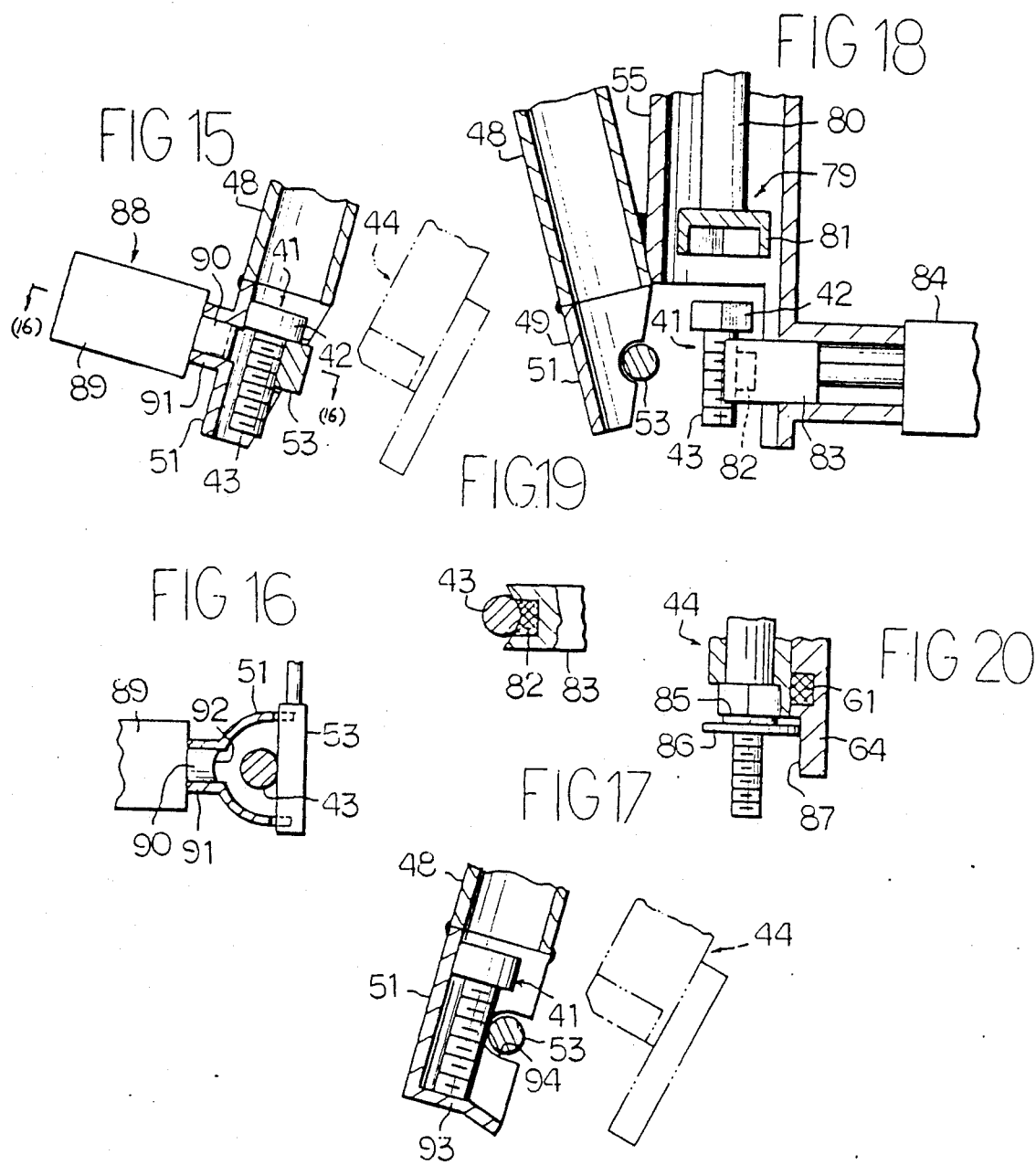

APPARATUS FOR FEEDING SLENDER PARTS

BACKGROUND OF THE INVENTION

This invention relates to an apparatus for feeding slender parts such as bolts to a predetermined place.

As for a mechanism for holding a slender part at the front end of a feed rod and feeding it to a predetermined place, there is one having a chuck mechanism installed on said feed rod. As for a method of guiding slender parts to the front end of the feed rod, there is a known one which uses a guide chute positioned orthogonal to the feed rod to move slender parts along said chute.

When the chuck mechanism described above is used, anything wrong with the chuck mechanism could result in the front end of the slender part inadvertently falling off as it interferes with some member when the feed rod is advanced. This is caused when the dogs of the chuck fail to form pairs with sufficient accuracy.

Further, when a guide chute such as described above is installed, it is necessary to provide a sufficiently large space to install the chute; thus, there are times when it is impossible to use such chute where the available space is limited.

And the most important problem is that a slender part should be held at the front end of the feed rod quickly and reliably. As for the attitude control of parts, it is very difficult to move a slender part, which comes through a feed tube, precisely to the front end of the feed rod without temporarily stopping said part. It becomes sometimes impossible to correctly hold the part at the front end of the feed rod.

SUMMARY OF THE INVENTION

To solve the problem described above, the apparatus for feeding slender parts according to this invention, which uses a feed rod for holding a slender part on its front end by a magnetic force imparted thereto and feeding it to an intended place, said apparatus comprising a feed tube for slender parts which is disposed at an acute angle with respect to the direction of stroke of said feed rod, the end of said feed tube being located adjacent the front end of said feed rod. The slender part is transferred from the end of the feed tube to the front end of the feed rod by said magnetic force.

In a preferred embodiment of the invention, a magnet is installed to exert a magnetic attractive force from outside the feed rod so as to transfer the upper portion of the slender part to the front end powerfully and quickly.

It is also possible to add a correcting cam surface for correcting the angle of inclination of the slender part in the vicinity of the end of the feed tube to effect smooth transfer of the part to the feed rod.

In the case of a slender part which is provided with a head member, a braking cam surface is added whereby the transfer speed of the slender part can be reduced in the final stage of the feeding through the feed tube to make reliable the transfer of the part to the feed rod.

Another form of the invention is a feed apparatus for holding a headed slender part at the front end of the feed rod means and feeding it an intended place, said apparatus comprising a feed tube disposed at an acute angel with respect to the direction of stroke of the feed rod means, the end of said feed tube being disposed in the vicinity of the front end of the feed rod means, a holder element on the end of said feed tube adapted to be advanced and retracted for correcting the attitude of the slender part. The slender part is temporarily locked by the holder element and when the holder element is retracted, the part is transferred to the front end of the feed rod means.

In a preferred embodiment of the invention, the inclined attitude of the feed tube is set so that the feed tube is located above the level of the feed rod means. When the slender part which is temporarily locked at the end of the feed tube is transferred to the feed rod means, the free falling of the part due to its weight is utilized.

It is possible to exert a magnetic attractive force on a slender part to effect transfer of it from the end of the feed tube to the feed rod means.

The feed rod means may be composed of a feed rod with a stop element provided on the front end thereof and a magnet disposed outside the stop element. In operation, the head member of a slender part is attracted by the magnet and correctly positioned by the stop element, whereupon the advance stroke of the feed rod is started.

The feed rod means is composed of a nut runner. In the case where a slender part is a headed bolt, the head is engaged and held by the box of the nut runner, whereby it is fed to a threaded hole of a mating part.

A driving device is added for transferring a slender part held by the feed tube end to the feed rod means; the slender part is forcibly passed to the feed rod means by the driving device.

A stop member for catching a descending slender part is added to the feed tube end so that both the movement control by the stop member and attitude retention of the part by the holder element are in action.

BRIEF DESCRIPTION OF THE DRAWINGS

FIG. 1 is a vertical sectional view of the feed apparatus of the present invention;

FIG. 2 is a sectional view taken along the line (2)—(2) in FIG. 1;

FIG. 3 is a side view of an alternate feed rod assembly of the present invention;

FIGS. 4 and 5 are sectional views showing modifications of a feed rod assembly of FIG. 1;

FIG. 6 is a vertical sectional view showing a modification of the apparatus of FIG. 1;

FIG. 7 is a sectional view taken along the line (7)—(7) in FIG. 6;

FIG. 8 is a side elevation view of a part of the feed tube of FIG. 6;

FIG. 9 is a longitudinal sectional view taken along the line (9)—(9) of FIG. 8;

FIG. 10 is a sectional view taken along the line (10)—(10) in FIG. 9;

FIG. 11 is a vertical sectional view showing an alternate embodiment of the invention;

FIG. 12 is a sectional view taken along the line (12)—(12) in FIG. 11;

FIG. 13 is a sectional view taken along the line (13)—(13) in FIG. 11;

FIG. 14 is a perspective view of a portion of a feed rod of FIG. 11;

FIG. 15 is a partial sectional view of a modification of the apparatus of FIG. 11;

FIG. 16 is a sectional view taken along the line (16)—(16) in FIG. 15;

FIG. 17 is a partial sectional view of another modification of the apparatus of FIG. 11;

FIG. 18 is a partial sectional view showing a nut runner in the apparatus of FIG. 11;

FIG. 19 is a partial cross-sectional view of the apparatus of FIG. 18; and

FIG. 20 is a partial sectional view of a still further modification of the apparatus of FIG. 11.

DESCRIPTION OF THE PREFERRED EMBODIMENTS

First, referring to a first embodiment shown in FIGS. 1 and 2, a magnet (permanent magnet) 2 is attached to the front end of a feed rod 1 adapted to be advanced and retracted, whereby a slender part 3 is magnetically attracted and held as shown in phantom lines. A feed tube 4 through which the slender part 3 comes there is installed at an acute angle with respect to the direction of stroke of the feed rod 1, as shown, with an open end 5 thereof being positioned adjacent the front end 6 of the feed rod.

The feed rod 1 is received in a sleeve 7 and adapted to be advanced and retracted by an air cylinder 8 joined to the upper end of the sleeve 7, the piston rod 9 thereof being connected to the feed rod 1. When the feed rod is advanced until the slender part 1 is close to a hole 11 in a mating member 10, the magnetic attractive force on the slender part 1 has to be annulled. To this end, the mechanism is designed so that the magnet 2 can be retracted.

More particularly, the feed rod 1 consists of a hollow shaft 12 and an inner shaft 13 slidably fitted therein, with the magnet 2 fixed (by bonding, for example) to the lower end of said inner shaft 13. The hollow shaft 12 has an elongated opening 14 extending in the direction of stroke, and a control pin 15 fixed to the inner shaft 13 projects therethrough, as shown. A coil spring 13' is received in the hollow shaft 12, so that its force urges the control pin 15 against the lower end of the elongated opening 14. In this state, the front end 6 of the feed rod 1 defines a plane with the end surface of the hollow shaft 12 being flush with the magnet 2, as shown.

An air cylinder 16 is fixed to the lower lateral surface of the sleeve 7, and its piston rod 17 has a locking element 18 attached thereto. The sleeve 7 also has an elongated opening 19 extending in the direction of stroke and the locking element 18 projects into the sleeve 7 through said elongated opening. The relative positions of the control pin 15 and locking element 18 are such that when the feed rod 1 has made its predetermined stroke, the control pin 15 comes immediately in front of the locking element 18.

The feed tube 4, as is clear from FIG. 2, is welded to the sleeve 7 by partially removing its wall. Further, as seen in this figure, since the feed rod has a roughly oval cross-section as shown, a rotation-preventive element 20 (FIG. 1) is provided. The front end 6 of the feed rod 1 is provided with a projection 21 which serves as a stop, whereby the slender part 3 which comes through the feed rod 1 is positioned correctly. The slender part 3 shown is a projection bolt, consisting of a bolt portion 22 corresponding to a stem and a circular flange portion 23 corresponding to a head member. In addition, projections for welding formed on the flange portion are omitted from the illustration. The feed tube 4 has a feed hose 24 of polyvinyl chloride or the like connected thereto, the other end being connected to a parts feeder (not shown).

The state shown in FIG. 1 is one in which the feed rod 1 is in its most retracted position, standing by for a slender part to descend. When the flange portion 23 shown in solid lines descends until it is close to the end of the feed tube 4, the attractive force of the magnet 2 causes the upper portion of the slender part 3 to move to the right until the flange portion 23 abuts against a projection 21; thus, it is magnetically held at the front end 6 of the feed rod 1, as shown in phantom lines. Subsequently, the feed rod 1 is advanced by the action of the air cylinder 8 to a position immediately in front of the hole 11 or with the slender part 3 into said hole 11, whereupon the advance movement of the feed rod 1 is stopped, when the control pin 15 is positioned immediately in front of the locking element 18. Subsequently, the air cylinder 16 retracts its piston rod 17, and this displacement is transmitted to the magnet 2 via the control pin 15 and inner shaft 13, whereby the magnet 2 is separated from the flange portion 23. Therefore, the magnetic attractive force on the slender part 3 substantially disappears, allowing the slender part 3 to fall into the hole 11; thus, the feeding of a part is completed.

As for the means for imparting a magnetic force to the front end of the feed rod, there are various systems besides one using a permanent magnet; for example, it is possible to use an electromagnet, as shown in FIG. 3. In this system, the feed rod 1 extends through an exciting coil 25, so that the magnetic attractive force can be removed by cutting the exciting current when the feed rod 1 has advanced by a predetermined amount.

FIG. 4 shows a modification wherein in order to increase the force with which the slender part 3 is transferred to the right, a magnet (permanent magnet) 26 is installed outside the front end 6 of the feed rod. More particularly, the magnet 26 is embedded in a guide plate 27 welded to the sleeve 7.

FIG. 5 shows a modification wherein a magnet (permanent magnet) 28 is installed outside the projection 21 on the feed rod 1, said magnet 28 being embedded in a slide plate 29 which is fixed to the inner shaft 13 by a bolt 30. The bolt 30 extends through an elongated opening 19, and for the mechanism for retracting the inner shaft 13 alone, it is possible to employ a system similar to the one shown in FIG. 1. Therefore, the slender part transferred by the magnet 28 is delivered to the intended place while it is held on the front end 6 of the feed rod 1 by the attractive force exerted by the magnet, and then the slender part is dropped by retracting the magnet 28. In addition, although there is no magnet shown in FIG. 5 installed on the inner shaft 13, if one is provided as illustrated, the retention of the slender part is improved.

A modification shown in FIGS. 6 through 10 will now be described, but the following description will be concentrated only on those points which differ from those described above. The most important element in this modification is a cam element 31 connected to the feed tube 4 or formed on the latter by build-up welding. A function of the cam element 31 is to displace the front end of the slender part 3 to the right as seen in the figures for correction purposes so as to make it easier for the slender part to move to the front end 6. Another function is, in the case where it has a flange portion, to brake the slender part at its flange portion to decrease its speed, thereby making its transfer to the front end 6 more reliable.

The cam element 31, as seen in FIGS. 7 and 10, has a gutter-shaped cross-section, with the cam surface consisting of a first cam surface portion 32 of large curvature and a second cam surface portion 33 which is nearly straight, said first and second cam surface portions being smoothly connected together. As is clear from FIG. 10, the front end of the feed rod 1 is in the form of a box which is open in one side, cooperating with the cam element 31 of gutter-shaped cross-section to completely surround the upper portion of the slender part 3 and determine the path of travel of the part.

If the slender part 3 coming down the feed tube 4 is coaxial with the feed tube 4 rather than inclined with respect to the axis of the feed tube 4, it advances without touching the cam surface portion 32, as shown by the state A, and is subjected to minor attitude correction by the other cam surface portion 33 so that the slender part is magnetically attracted and held at the front end 6 of the feed rod. On the other hand, if the slender part 3 comes down as it is inclined to the right, it is first subjected to major attitude correction by the cam surface portion 32 and then transferred while it is magnetically attracted. In the case where it has a flange portion 23 as shown, the flange portion 23 comes in powerful contact with the cam surface portion 32, and the resulting friction force serves to brake the slender part 3. Therefore, the descending speed of the slender part 3 is decreased and hence the transfer to the front end 6 is made more reliable.

The projection 21 shown in FIG. 6 is provided with a support element 34 continuously extending therefrom. This serves to control the slender part 3 to prevent it from turning in the vertical direction, the front end of said support element being either contacted with the bolt portion 22 or spaced therefrom with a slight clearance therebetween. Particularly, when the slender part 3 is vigorously transferred to the front end 6, the inertia force tends to cause the lower side of the part 3 to turn counterclockwise by a large amount, but the control function of the support element 34 minimizes the turning movement, making the sticking to the front end 6 reliable. In the case of FIG. 6, since the feed rod 1 is inclined as shown, the support element 34 is functioning also during the forward movement of the feed rod 1. Further, when the magnetic attractive force disappears with the feed rod 1 coming to a halt at the position shown in phantom lines, the slender part 3 is turned counterclockwise around the front end of the support element 34 while rubbing said front end; in this manner it falls into the hole 11, as shown. In addition, the reference character 35 in FIG. 6 is a fixed electrode for spot welding, the movable electrode opposed thereto being omitted from the illustration.

According to the invention, a slender part is magnetically held at the front end of the feed rod and the feed tube for slender parts is disposed at an acute angle with respect to the feed rod, with the end of said feed tube being disposed adjacent the front end of the feed rod; therefore, the slender part reaching the end of the feed tube is reliably and quickly transferred to the front end of the neighboring feed rod and the magnetic holding of the slender part at the front end of the feed rod is achieved with high accuracy.

The provision of a magnet outside the front end of the feed rod makes it possible to increase the attractive force on a slender part for transfer, whereby the transfer speed can be increased and reliable transfer ensured.

Since a cam is formed on the inner surface of the front end of the feed tube, the angle of inclination of a slender part is corrected to minimize the amount of movement of the whole part involved when the upper portion of the part is transferred to the front end of the feed rod.

In the case where the slender part has a head member formed thereon, the head member comes in powerful contact with the cam surface to decrease the transfer speed of the part and hence the kinetic energy thereof, thereby enabling the upper portion of the part to move to the front end of the feed rod easily and accurately.

While developing the unique effects as described above, the invention is capable of solving the problems about the chuck mechanism and installation space.

An embodiment applicable to a headed slender part shown in FIGS. 11 through 14 will now be described. A headed slender part (hereinafter referred to simply as slender part) in this embodiment is a bolt 41 as shown, consisting of a head 42 and a stem 43, while a feed rod 44 is shown as the feed rod means.

The front end of the feed rod 44 adapted to be advanced and retracted is shaped as shown in FIG. 14, provided with a stop element 45 for catching the head 42. In the illustrated case, a U-shaped frame is formed to hold the head 42 more stably, said frame having wall members 46 disposed on opposite sides and an open portion 47. The feed tube 48 for guiding a slender part 41 is disposed at an acute angle with respect to the direction of stroke of the feed rod 44 and its end 49 is disposed in the vicinity of the front end 50 of the feed rod. A short tube 51 welded to the front end of the feed tube 48 forms the end 49. The right-hand side of the short tube 51, i.e., the side associated with the front end 50 of the feed rod 44 is shown as an open portion 52, in which a holder element 53 is installed so that it can be advanced and retracted; thus, a bolt 41 which has come down the feed tube 48 is locked, as shown, at its head 42 in a narrow place between the inner surface of the end 49 and the holder element 53, establishing a state which is so-called temporarily locked positioning.

The method of advancing and retracting this holder element 53 is shown in FIG. 12, wherein an air cylinder 57 is fixed to a bracket 56 joined to a sleeve 55 to be later described, the piston rod 58 thereof being connected to the holder element 53.

The feed rod 44 is received in the sleeve 53 and adapted to be advanced and retracted by an air cylinder 59 joined to the upper end of the sleeve 55, the piston rod 60 thereof being joined to the feed rod 44. A magnet (permanent magnet) 61 is installed outside the stop element to transfer the bolt 41, which is in the illustrated position in FIG. 11, to the feed rod 44. When the feed rod 44 is advanced until the bolt 41 is close to a hole 63 in a mating member 62, it is necessary to annul the magnetic attractive force on the bolt 41. To this end, the magnet 61 is designed to be retractable. That is, the magnet 61 is embedded in a slide element 64, which is moved upward with respect to the feed rod 44, whereby the magnet 61 is spaced from the stop element 45, substantially annulling the magnetic attractive force on the head. To realize such behavior, the feed rod 44 consists of a hollow shaft 65 and an inner shaft 66 slidably fitted therein, and the slide element 64 is fixed to the inner shaft 66 by a fixing bolt 67. The fixing bolt 67 extends through an elongated opening 68 formed in the hollow shaft 65 and extending in the direction of stroke.

The hollow shaft 65 is formed with an elongated opening 69 extending in the direction of stroke and a control pin 70 fixed to the inner shaft 66 projects, as shown. A coil spring 71 is housed in the hollow shaft 65, urging the control pin 70 to abut against the lower end of the elongated opening 69. An air cylinder 72 is fixed to the lower lateral surface region of the sleeve 55 and its piston rod 73 has a locking element 74 attached thereto, said locking element extending into the sleeve 55 through an elongated opening 75 formed therein to extend in the direction of stroke. The relative positions of the control pin 70 and locking element 74 are such that when the feed rod 44 has made its predetermined stroke, the control pin 70 comes immediately in front of the locking element 74.

The feed tube 48 and sleeve 55 are welded together as at 76 with an acute angle formed therebetween, as shown in FIG. 11. The inclined attitude of the feed tube 48 is set so that it is positioned above the level of the feed rod 44. In other words, the feed tube 48 is inclined to the right as viewed in FIG. 11. In addition, another magnet (permanent magnet) 77 is installed on the front end of the inner shaft 66 to increase the attractive force with which the bolt is attracted to the front end 50 of the feed rod, but this magnet may be omitted, as desired. In addition, a feed hose 78 is connected to the feed tube 48.

When the bolt 41 comes down the feed tube 48 as shown in phantom lines and has its head 42 caught between the inner surface of the end 49 and the holder element 53, this results in the temporary locking of the bolt 41 as shown in solid lines. This temporary locking provides predetermined positioning; then the holder element 53 is retracted, so that the bolt 41 is moved to the right by the attractive force of the magnet 61 (in the illustrated case, the attractive force of the magnet 77 also works) and the head 42 is received by the stop element 45, whereupon the transfer to the front end 50 of the feed rod is completed. Subsequently, the feed rod 44 is advanced until the bolt 41 held on its front end comes close to a hole 63, whereupon the feed rod 44 is stopped and almost simultaneously therewith the locking element 74 is pulled up by the air cylinder 72 and hence the control pin 70 is also pulled up simultaneously, its displacement being transmitted to the magnet 61 via the inner shaft 66, fixing bolt 67 and slide element 64; finally, the magnets 61 and 77 are spaced from the head 42, so that the attractive force on the head 42 substantially disappears and the bolt falls with its front end first into the hole 63.

A modification shown in FIGS. 15 and 16 will now be described. This is designed so that a bolt 41 temporarily locked inside a short tube 51 is forcibly transferred to the feed rod 44 by a driving device 88. In this case, this transfer is realized by a driving air cylinder 89 and its piston rod 90. A guide tube 91 branches from the short tube 51 and the driving air cylinder 89 is fixed thereto and the front end of the piston rod 90 terminates in an arcuate recess 92, as is obvious from FIG. 16. In this case, the holder element 53 has a quadrangular cross section to improve the ability to hold the head 42. The operation of this embodiment can be easily understood from that of the preceding embodiment and hence a description thereof will be omitted. In addition, the rest of the construction of this embodiment is the same as in the preceding embodiment.

FIG. 17 shows a modification wherein the end of the feed tube, i.e., the end of the short tube 51 is provided with a stop member 93 for forcibly stopping the bolt 41 which has come down, the holder element 53 being designed to extend through a notch 94 formed in the short tube.

FIGS. 18 and 19 show a case in which the feed rod means is a nut runner 79. The nut runner 79 consists of a rotatable shaft 80 and a box 81 adapted to fit on the hexagonal bolt head 42, and a receiver 83 having a magnet 82 embedded therein for the positioning of the bolt 41 is adapted to be advanced and retracted by an air cylinder 84, as shown. When the nut runner 79 comes down until the box 81 fits on the head 42, the receiver 83 is retracted and the bolt 41 is fed into a threaded opening in a mating member (not shown), whereupon the bolt 41 is turned for tightening.

FIG. 20 shows a modification applicable to a case in which the bolt 41 is provided with a spring washer 85 and a plain washer 86 and a slide element 64 is formed with an arcuate notch 87 which coincides with the plain washer 86.

According to the present invention, a slender part which has come moving through the feed tube is once stopped at the feed tube end by the cooperation between the inner surface thereof and the holder element, when the correct attitude prior to transfer is imparted to the slender part. As a result, when the holding function of the holder element is cancelled, the slender part begins transfer from its normal position and hence it is correctly moved to the front end of the feed rod means.

Since a part is held by a magnet at the front end of the feed rod means, there is no problem whatsoever caused by the chuck mechanism as previously described. Further, since the feed tube is disposed at an acute angle with respect to the direction of stroke of the feed rod means, the problem about installation space as in the guide chute described above can be eliminated.

The inclined attitude of the feed tube is set so that the feed tube is located above the level of the feed rod means; therefore, when a slender part is transferred to the front end of the feed rod means, it is possible to utilize the weight of a slender part itself and the direction and speed become more desirable.

And since the attractive force of a magnet is utilized in transferring a part, the transfer operation is reliable and fast.

Further, since this magnet is installed outside the stop element, the ability to hold a part at the front end of the feed rod means can be further improved.

By employing a nut runner as the feed rod means, automatic tightening of bolts can be accurately and easily realized.

Since the driving device is installed in the side associated with the feed tube end, a slender part can be forcibly transferred to the feed rod, and even under conditions which make it necessary to lift a slender part, its transfer can be effected by this driving device without any trouble.

The provision of a stop member at the end of the feed tube enables a slender part coming down vigorously to be reliably stopped, adding to operational reliability.

What is claimed is:

1. Apparatus for feeding slender parts to a predetermined location comprising:
    a feed rod having means for magnetically holding a slender part at one end thereof,
    means mounting said feed rod for reciprocating movement between a retracted position spaced away from said location and a second position adjacent said location,
    a feed tube having a lower end open adjacent said one end of said feed rod in said retracted position, said lower end of said feed tube having an axis disposed at an acute angle relative to the axis of the path of said reciprocating movement of said feed rod, and means for supplying slender parts to an upper part of said feed tube whereby said slender parts fall freely through said feed tube and are delivered by said lower open end of said feed tube to said means for magnetically holding a slender part at one end of said feed rod with the axes of said slender parts oriented at an acute angle relative to said axis of the path of movement of said feed rod.

2. An apparatus for feeding slender parts as set forth in claim 1, wherein an inner surface of the lower end of said feed tube is formed with a cam surface for correcting the angle of inclination of a slender part.

3. An apparatus for feeding slender parts as set forth in claim 1, wherein an inner surface of the lower end of said feed tube is formed with a cam surface for correcting the angle of inclination of a slender part and for applying a braking force to a head member of the slender part.

4. The apparatus for feeding slender parts as set forth in claim 1 wherein said lower end of said feed tube is open for delivering slender parts at one side of said one end of said feed rod in said retracted position and a magnet is disposed on a second side of said feed rod opposite said feed tube for enhancing magnetic attraction of slender parts from said feed tube toward said one end of said feed rod.

5. Apparatus for feeding headed slender parts to a predetermined location comprising:

a feed rod having means for magnetically holding a headed slender part at one end thereof, means mounting said feed rod for reciprocating movement between a retracted position spaced away from said location and a second position adjacent said location, a feed tube disposed at an acute angle relative to the path of said reciprocating movement of said feed rod with a lower open end of said feed tube located in the vicinity of said one end of said feed rod in said retracted position, means for supplying headed slender parts to an upper part of said feed tube, a holder element movable between an advanced position blocking the lower open end of said feed tube to correct the attitude of a headed slender part therein and a second position withdrawn from said open end of said feed tube, and means for moving said holder element, whereby said headed slender parts fall freely through said feed tube and are delivered at a correct attitude to said means for magnetically holding a headed slender part at one end of said feed rod.

6. An apparatus for feeding headed slender parts as set forth in claim 5, wherein said feed tube and said feed rod are disposed at an inclination with the open lower end of the feed tube located below the level of said one end of said feed rod in said retracted position.

7. An apparatus for feeding headed slender parts as set forth in claim 5, wherein said lower end of said feed tube is open at one side of said one end of said feed rod in said retracted position and a magnet is disposed on a second side of said feed rod opposite said feed tube and said slender part is transferred to said one end of the feed rod by the attractive force of said magnet when said holder is moved to said second position.

8. An apparatus for feeding headed slender parts as set forth in claim 5, wherein a stop element for stopping a headed slender part is provided at said one end of said feed rod and a magnet is disposed outside said stop element.

9. An apparatus for feeding headed slender parts as set forth in claim 5, wherein said feed rod is a nut runner.

10. An apparatus for feeding headed slender parts as set forth in claim 5, including a driving device at the lower end of the feed tube for transferring a headed slender part held on the end of the feed tube to said feed rod.

11. An apparatus for feeding headed slender parts as set forth in claim 5, wherein the lower end of the feed tube is provided with a stop member for catching a headed slender part falling through said feed tube.

* * * * *